(12) United States Patent
Bhatoolaul et al.

(10) Patent No.: US 7,076,262 B1
(45) Date of Patent: Jul. 11, 2006

(54) MESSAGE ACCESS FOR RADIO TELECOMMUNICATIONS SYSTEM

(75) Inventors: David Lahiri Bhatoolaul, Grange Park (GB); Qiang Cao, Swindon (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/936,101

(22) PCT Filed: Dec. 10, 1999

(86) PCT No.: PCT/GB99/04180

§ 371 (c)(1),
(2), (4) Date: Sep. 7, 2001

(87) PCT Pub. No.: WO00/56107

PCT Pub. Date: Sep. 21, 2000

(30) Foreign Application Priority Data

Mar. 18, 1999 (GB) .................................. 9906198.8

(51) Int. Cl.
*H04B 7/00* (2006.01)
(52) U.S. Cl. ...................... 455/522; 455/434; 455/450; 455/69; 455/161.2
(58) Field of Classification Search ................ 455/422, 455/434, 450, 522, 67.1, 63, 69, 70, 561, 455/436, 437, 33.1, 56.1, 435, 161.2
See application file for complete search history.

(56) References Cited

U.S. PATENT DOCUMENTS

| | | | | |
|---|---|---|---|---|
| 5,287,545 A | * | 2/1994 | Kallin | 455/510 |
| 5,386,589 A | * | 1/1995 | Kanai | 455/423 |
| 5,794,129 A | * | 8/1998 | Komatsu | 455/69 |
| 6,081,713 A | * | 6/2000 | Desgagne | 455/436 |
| 6,292,471 B1 | * | 9/2001 | Cao et al. | 370/252 |
| 6,377,804 B1 | * | 4/2002 | Lintulampi | 455/435.2 |
| 6,587,672 B1 | * | 7/2003 | Chuah et al. | 455/69 |
| 6,628,956 B1 | * | 9/2003 | Bark et al. | 455/522 |

FOREIGN PATENT DOCUMENTS

| WO | WO 97/46033 | 12/1997 |
|---|---|---|
| WO | WO 98/18280 | 4/1998 |

* cited by examiner

*Primary Examiner*—Fan Tsang
*Assistant Examiner*—Md S. Elahee

(57) ABSTRACT

In a UMTS, the AICH is arranged to send, in addition to a signal acknowledging that a preamble from a mobile is at an acceptable strength, an additional signal indicating that the mobile is not currently permitted to send its message; this may apply when the BTS does not have hardware resources available. If the BTS can predict when the hardware will become available, the additional signal can include a time out (T) after which the mobile system can send its message signal.

2 Claims, 4 Drawing Sheets

MESSAGE ACCESS FOR RADIO TELECOMMUNICATIONS SYSTEM

This invention relates to an improved message access arrangement for a radio telecommunications system such as Universal Mobile Telecommunications System (UMTS) and relates especially to message acquisition indications.

To make a connection to the UMTS system, in known arrangements a mobile telephone sends its preamble at a first power, and waits for an acquisition indication on the Acquisition Indication Channel (AICH); if no indication is received, the preamble is resent at increased power, in steps, until an indication is received on the AICH. The message is then sent and if no positive acknowledgement is received via the Forward Access Channel (FACH), the message is assumed to be corrupted and it is resent. The arrangement is set out in I-95 and UMTS standards.

In WO/98/18280 Ericsson, there is disclosure of a mobile communications system in which, during call set up, a mobile station transmits a random access packet that includes a preamble and a plurality of fields; more efficient call set up is facilitated. Further, each mobile station transmits a different preamble symbol pattern, and each base station receiver includes a plurality of accumulators, each tuned to a different preamble symbol pattern. Consequently, the base station can distinguish between simultaneous random access requests.

A problem with the prior art arrangements is that the base transceiver station must always have a sufficient level of hardware redundancy to ensure that the message parts of all detected preambles can be processed. This adds a high cost to the base transceiver station, and limits the number of access slots and preamble signatures allowed for each base transceiver station to achieve a given message throughput.

It is the object of the invention to provide a system which has a reduced requirement for hardware redundancy.

According to the invention a radio mobile telecommunications system comprises a base transceiver station arranged to manage a plurality of mobile systems within at least one telecommunications cell; the base station having means to provide an acquisition indication channel by which an acknowledgement signal is sent to indicate that the strength of a preamble signal sent by that mobile system to the base transceiver station has reached a predetermined level; characterised in that said acknowledgement signal is arranged to indicate in addition that the mobile system must not immediately send a message signal.

In the accompanying drawings, the prior art is illustrated in FIGS. 1–7 in which:—

The invention will be described with reference to FIGS. 8 and 9 in which:—

Figure 8:
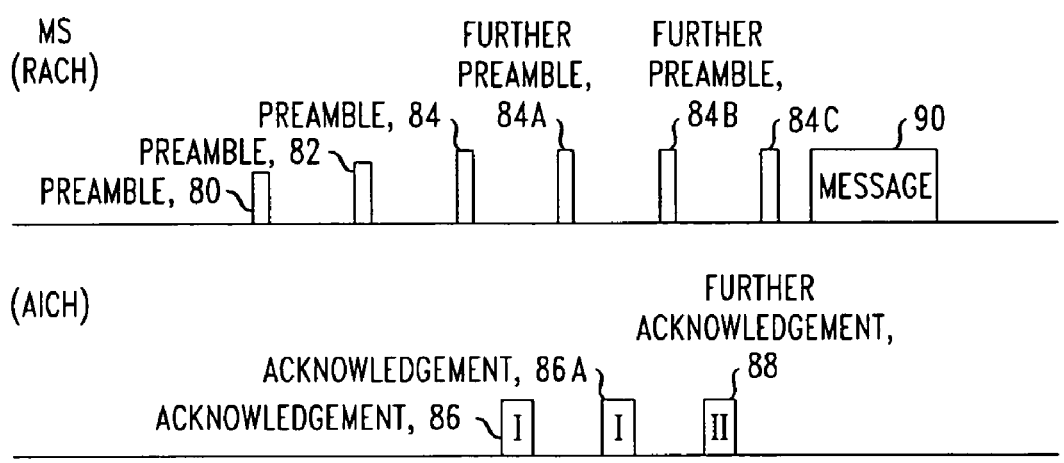

FIG. 8 indicates RACH and AICH messages in one embodiment of the invention; and

Figure 9:
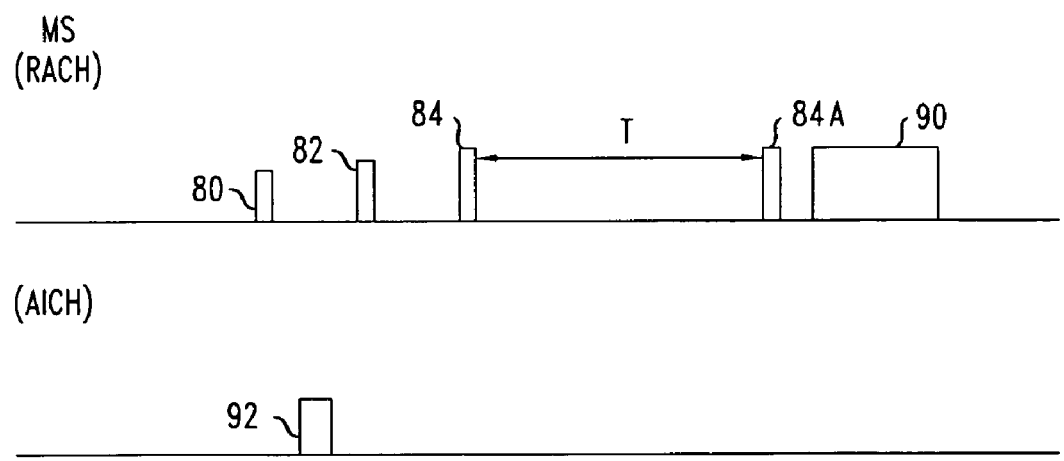

FIG. 9 indicates RACH and AICH messages in a second embodiment of the invention.

Figure 1:
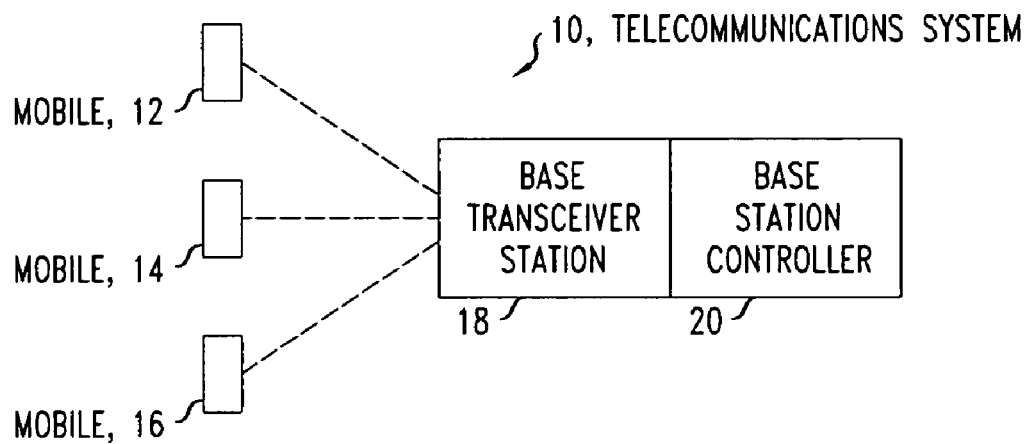
FIG. 1 is a schematic diagram of a part of a radio telecommunications system.

In FIG. 1, a part 10 of the UMTS is illustrated, comprising a plurality of mobile systems 10, 12, 14, 16 associated with a telecommunications cell controlled by a Base Transceiver Station (BTS) 18 having a Base Station Controller (BSC) 20.

Figure 2:
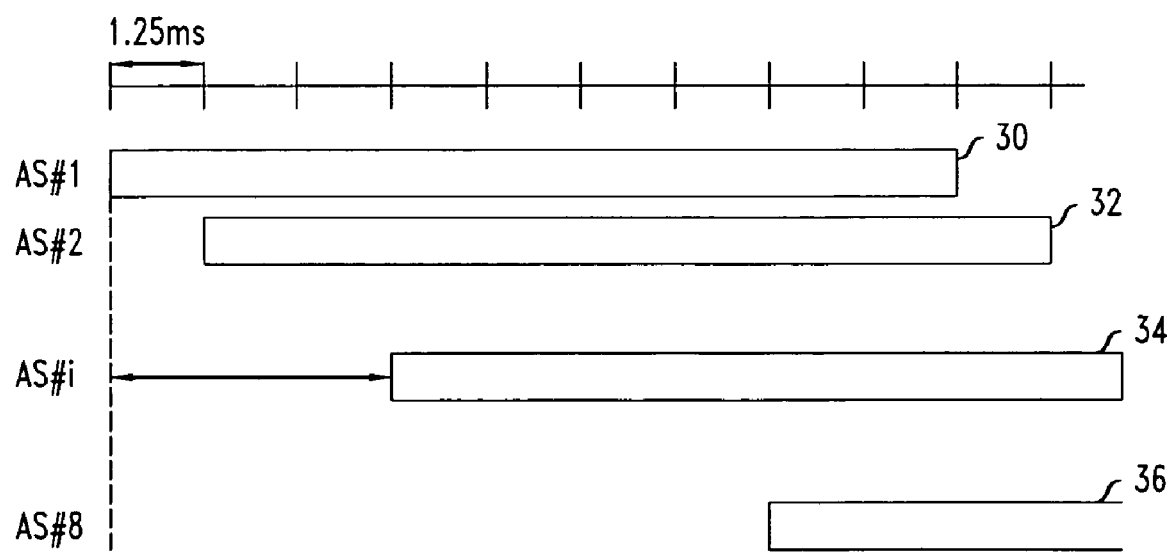
FIG. 2 illustrates a physical random access channel slots structure.

When a mobile such as 12 wishes to make a call, it utilises the Random Access Channel (RACH) of the UMTS which is mapped to the Physical Random Access Channel (PRACH). Transmission in this transport channel is based on the well known slotted Aloha approach, that is, a mobile can start a transmission of the PRACH at any one of a number of well defined time offsets, denoted access slots AS and illustrated in FIG. 2. The slots are spaced 1.25 milliseconds apart. Several of the slots in FIG. 2 are shown as filled by random access transmissions 30, 32, 34, 36.

Figure 3:
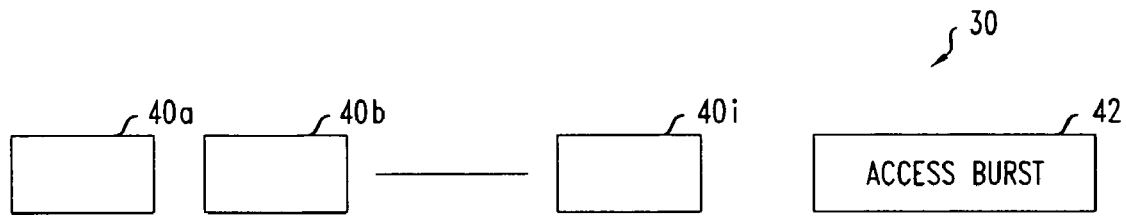
FIG. 3 illustrates the structure of a random access transmission.

FIG. 3 illustrates the structure of a Random Access Transmission such as transmission 30; there are several preamble parts 40a, 40b, 40i, each of length 1 millisecond, and an access burst 42 which contains the preamble part, plus a message part of length 10 milliseconds.

Figure 4:
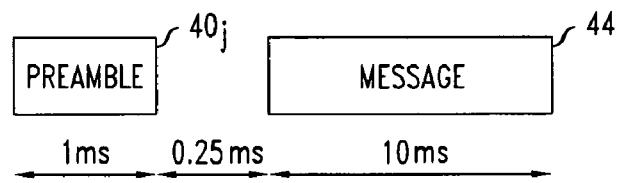
FIG. 4 illustrates the structure of an access burst from a mobile.

FIG. 4 shows the structure of the access burst 42. Between a preamble 40j and the message part 44 there is an idle time period of length 0.25 milliseconds. This idle period allows for detection of the preamble part and subsequent online processing of the message part.

Figure 5:
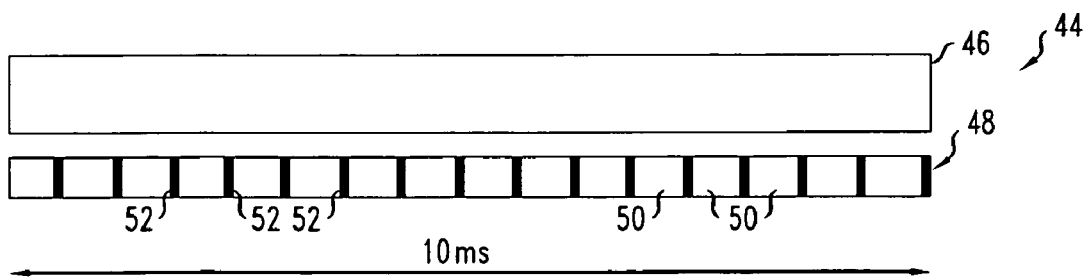
FIG. 5 illustrates the message part of the random access burst.
Figure 6:
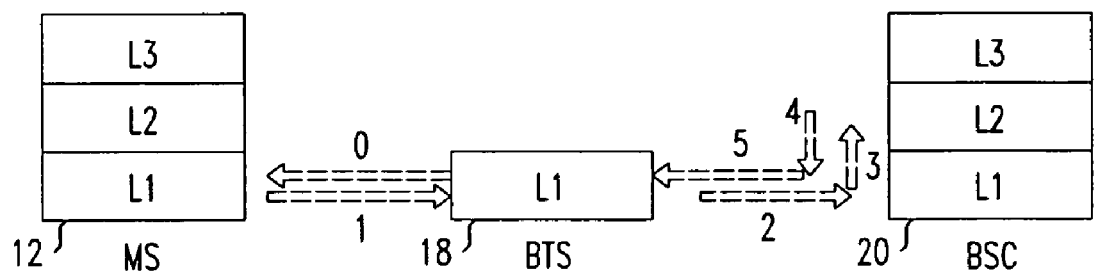
FIG. 6 illustrates the layers involved in message acknowledgement.

FIG. 5 shows that the RACH message part 44 consists of a data part 46, corresponding to the uplink Dedicated Physical Data Channel (DPDCH) and a Layer 1 control part 48, corresponding to the uplink Dedicated Physical Control Channel (DPCCH). The data and control parts 46, 48 are transmitted in parallel.

The data part 46 carries Layer 2/Layer 3 messages requesting radio resources or a user packet. The spreading factor of the data part is limited to $SF_e\{256, 128, 64, 32\}$ corresponding to channel bit rates of 16, 32, 64 and 128 Kbps respectively. The control part 48 carries pilot bits 50 and rate information 52, using a spreading factor of 256. The rate information indicates a spreading factor of the channelisation code which is used on the data part.

For RACH transmission, the technique of preamble power ramping is used, and the procedure used by a random request has the following actions:—

1. After cell search and synchronisation, the mobile 12 reads the Broadcast Control Channel (BCCH) (not illustrated) to get information about
   i the preamble spreading code(s)
   ii the available signatures
   iii the available access slots
   iv the available spreading factors for the message part
   v the uplink interference level in the cell
   vi the primary CCPCH (Common Control Physical Channel) transmit power level
2. The MS selects a preamble spreading code and thus the message scrambling code.
3. The MS selects a preamble signature and uses it to determine the primary node of the channelisation codes used by the message part of the access burst.
4. The MS selects a channelisation code (corresponding to a spreading factor) for the message part.
5. The MS estimates the downlink path loss (by using information about the transmitted and received power level of the primary CCPCH), and determines the required uplink transmit power (by using information about the uplink interference level in the cell).

6. The MS implements the dynamic persistence algorithm by:
   Reading the current dynamic persistence value from the BCH.
   Performing a random draw against the current dynamic persistence value.
   Deferring transmission for one frame and repeating step 6 if the result of the random draw is negative, otherwise proceeding to step 7.
7. The MS randomly selects an access slot from the available access slots.
8. The MS transmits its preamble at a negative power offset relative to the estimated uplink transmit power. This is illustrated at reference 60 in FIG. 7.
9. The MS waits for an acquisition indication (on the AICH) from the network side. If none is received within a predefined time-out period, the MS transmits the preamble again but with a smaller power offset and a re-selected preamble signature, reference 62, showing the higher power.
10. Step 8 is repeated, reference 64, showing a further increase in power, and an acquisition indicator 66 is received from the network side that indicates the acceptance by the network side of the preamble at that power offset. The acquisition indicator 66 is received on the AICH.
11. If an acquisition indicator is received on the AICH in Step 9, the random access burst is transmitted in the next available access slot. This burst comprises a repeated preamble 64A and a message 68.
12. If the message 68 is corrupted, as indicated by the dotted lines, then there is no positive acknowledgement and actions 1 to 11 are repeated, references 70 to 78; message 78 is successfully received, and an acknowledgement 80 is sent from the network on FACH.

Turning now to the first embodiment of the invention illustrated in FIG. 8, as before the MS 12 sends three preamble signals 80, 82; 84 of increasing strength; when the BTS 18 receives signal 84, it now sends on the AICH an acknowledgement signal 86, variant 1, which indicates to the MS 12 that the strength of the preamble 84 is acceptable (i.e. it has passed a Cyclic Redundancy Check (CRC) performed in the BTS 18) but that there is no hardware available to process the message immediately. In response, the MS 12 re-sends the preamble, 84A at the same strength as before. On receipt, the BTS 18 still does not have resources, and sends the second acknowledgement signal 86A, variant I. The mobile sends the preamble for the third time at the same strength, 84B; the BTS 18 now has resources and sends an acknowledgement signal 88, variant II which indicates that the MS 12 can now send its message; the MS sends preamble 84 again, 84C, and its message 90.

Figure 7:
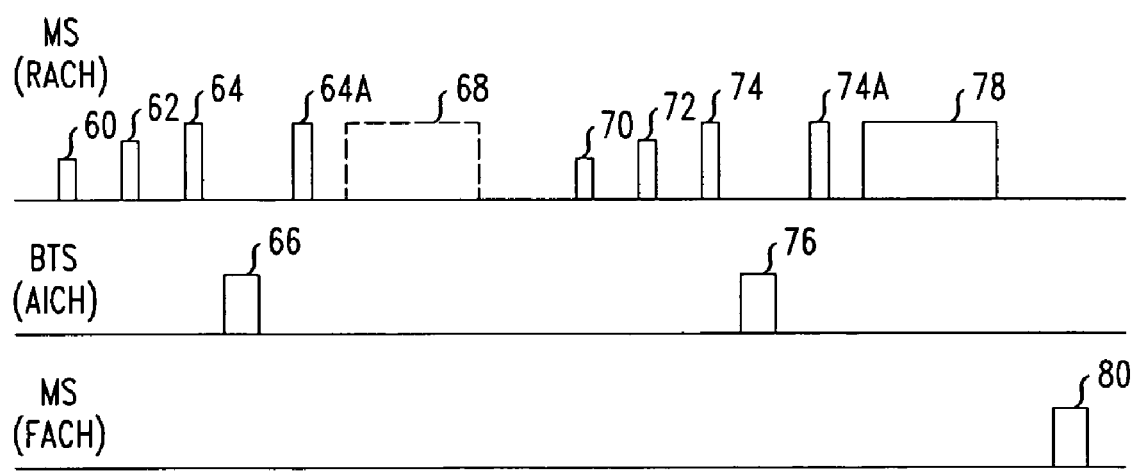
FIG. 7 illustrates how random access acquisition indication and forward access channels interact to acknowledge preamble and message signals from a mobile.

Variant II of the acknowledgement signal 88 is identical to the signal 66 and 76 in FIG. 7.

A second embodiment of the invention is illustrated in FIG. 9. As before, the MS 12 sends three preamble signals 80, 82, 84 of increasing strength; when the BTS 18 receives signal 84, at which the signal strength is acceptable, it sends on the AICH an acknowledgement signal 92. The signal 92 is sent when the BTS 18 does not currently have available hardware to process a message immediately, but is able to predict when resources will become available; the signal 92 contains a time out period T, after which hardware will become available. The MS 12 then waits for the period T since last sending its preamble, and resends the preamble at the same strength as before, 82A, and its message 90, i.e. a random access burst is transmitted in the next available time slot after the time out.

Unlike the previous variants, these acknowledgement signals now contain additional timing information indicating to the MS when to transmit its message burst, in application of the invention, the difference is that in step 11 the procedure now reads:

"If an acquisition indicator is received on the AICH in Step 9, the random access burst is transmitted in the next available access slot as indicated by the timing information now included with this variant of the acknowledgement signal. This burst comprises a repeated preamble 64A and a message 68".

By use of the invention the available hardware resources are used efficiently, with minimum delays to call connection.

In addition, as disclosed in our co-pending application number WO-A-00/56096 filed on even date, the AICH can be used to send a negative acknowledgement to the MS 12 if reception of the message 90 fails the CRC performed in the BTS 18.

The invention claimed is:

1. A radio mobile telecommunications system comprises a base transceiver station arranged to manage a plurality of mobile systems within at least one telecommunications cell; the base transceiver station having means to provide an acquisition indication channel by which a first acknowledgement signal is sent to indicate that the strength of the preamble signals of increasing strength sent by a mobile system to the base transceiver station has reached a predetermined acceptable level; characterized in that said first acknowledgement signal is arranged to indicate in addition that the mobile system must not send a message signal for a predicted time since resources at said base transceiver station are currently unavailable to process said message signal, but must send upon expiry of the predicted time a further preamble at the same acceptable strength level; and the base transceiver station having means to send a further acknowledgement signal in response to the further preamble indicating that the mobile system is permitted to send the message signal.

2. A method of operating a radio base transceiver station comprising:
   receiving spaced preambles of increasing strength from a mobile station;
   sending a preamble acknowledgement signal on an acquisition indication channel when a preamble reaches an acceptable strength wherein the preamble acknowledgement signal further indicates that the mobile system is not permitted to send its message signal for a predicted period since resources at said base transceiver station are currently unavailable to process said message signal, but must send upon expiry of the predicted period a further preamble at the same acceptable strength level;
   receiving said further preamble from the mobile station;
   sending a preamble acknowledgement signal of a second type indicating that the mobile station is permitted to send its message signal; and receiving the message signal from the mobile station.

* * * * *